US012803032B2

(12) United States Patent
Park et al.

(10) Patent No.: US 12,803,032 B2
(45) Date of Patent: Nov. 17, 2026

(54) LAMINATION DEVICE AND METHOD FOR DISCHARGING DEFECTIVE ELECTRODE CELL ASSEMBLY OF LAMINATION DEVICE

(71) Applicant: LG Energy Solution, Ltd., Seoul (KR)

(72) Inventors: Hyun Jae Park, Daejeon (KR); Ha Yong Jung, Daejeon (KR); Jong Myung Lee, Daejeon (KR); Gyu Hwan Choe, Daejeon (KR); Kyu Sang Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 889 days.

(21) Appl. No.: 17/917,677

(22) PCT Filed: Jan. 28, 2022

(86) PCT No.: PCT/KR2022/001615
§ 371 (c)(1),
(2) Date: Oct. 7, 2022

(87) PCT Pub. No.: WO2022/169238
PCT Pub. Date: Aug. 11, 2022

(65) Prior Publication Data

US 2023/0155159 A1 May 18, 2023

(30) Foreign Application Priority Data

Feb. 4, 2021 (KR) ........................ 10-2021-0016038

(51) Int. Cl.
*H01M 10/04* (2006.01)
*G01B 11/02* (2006.01)
(Continued)

(52) U.S. Cl.
CPC ....... *H01M 10/0404* (2013.01); *G01B 11/026* (2013.01); *G01B 11/06* (2013.01); *G01N 21/95* (2013.01)

(58) Field of Classification Search
CPC ..... B32B 41/00; G01B 11/022; G01B 11/026; G01B 11/06; G01B 11/0691; G01B 2210/44; G01B 2210/50; H01M 10/0404
See application file for complete search history.

(56) References Cited

U.S. PATENT DOCUMENTS 9,147,326 B2 9/2015 Kotula
12,431,524 B2 * 9/2025 Lee .................. H01M 10/0404
(Continued)

FOREIGN PATENT DOCUMENTS

CN 101214482 A 7/2008
CN 109952678 A 6/2019
(Continued)

OTHER PUBLICATIONS

Extended European Search Report for Application No. 22749987.8 dated Mar. 25, 2024. 7 pgs.
(Continued)

*Primary Examiner* — Minh N Trinh
(74) *Attorney, Agent, or Firm* — Lerner David LLP

(57) ABSTRACT

A lamination apparatus configured to manufacture an electrode cell assembly may include a lamination part configured to manufacture the electrode cell assembly through lamination, an inspection part configured to detect a defective electrode cell assembly by measuring a thickness of the manufactured electrode cell assembly, a discharge part configured to separate and discharge the defective electrode cell assembly from a normal electrode cell assembly, and a control part configured to perform control so as to calculate a time point at which the defective electrode cell assembly reaches the discharge part on the basis of distance data between a point at which the defective electrode cell assembly is detected and the discharge part and separate and discharge the defective electrode cell assembly when the defective electrode cell assembly reaches the discharge part.
(Continued)

A method of discharging a defective electrode cell assembly by the lamination apparatus is also disclosed.

9 Claims, 5 Drawing Sheets

(51) Int. Cl.
*G01B 11/06* (2006.01)
*G01N 21/95* (2006.01)

(56) References Cited

U.S. PATENT DOCUMENTS

| | | | | |
|---|---|---|---|---|
| 2019/0101386 | A1 | 4/2019 | Akahori | |
| 2020/0235433 | A1 * | 7/2020 | Kim | H01M 10/0585 |
| 2021/0164769 | A1 | 6/2021 | Jung | |
| 2023/0155159 | A1 * | 5/2023 | Park | G01B 11/06 29/730 |

FOREIGN PATENT DOCUMENTS

| | | | | | |
|---|---|---|---|---|---|
| CN | 211989724 | U | | 11/2020 | |
| DE | 102016122632 | A1 | | 5/2018 | |
| EP | 2940753 | A1 | | 11/2015 | |
| JP | 6543670 | B2 | | 7/2019 | |
| KR | 20100131701 | A | | 12/2010 | |
| KR | 101574569 | B1 | | 12/2015 | |
| KR | 20160040651 | A | * | 4/2016 | H01M 4/139 |
| KR | 101810025 | B1 | | 12/2017 | |
| KR | 101856875 | B1 | | 5/2018 | |
| KR | 20200066901 | A | * | 6/2020 | H01M 10/058 |
| KR | 102133915 | B1 | | 7/2020 | |
| KR | 102146945 | B1 | | 8/2020 | |
| KR | 102167118 | B1 | | 10/2020 | |
| WO | WO-2015045533 | A1 | * | 4/2015 | H01M 4/139 |
| WO | 2021/008555 | A1 | | 1/2021 | |

OTHER PUBLICATIONS

International Search Report for Application No. PCT/KR2022/001615 mailed May 10, 2022, pp. 1-3.

* cited by examiner

【FIG. 1】
-- Prior Art --
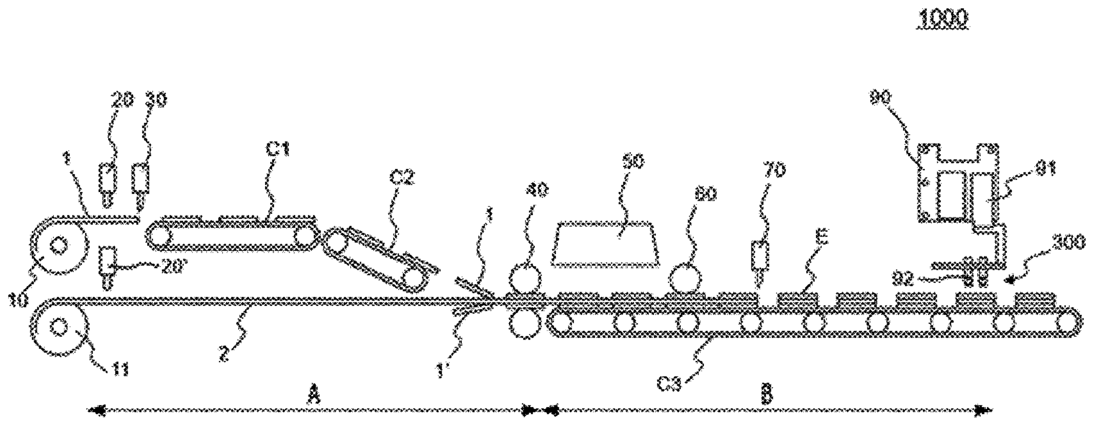

【FIG. 2】
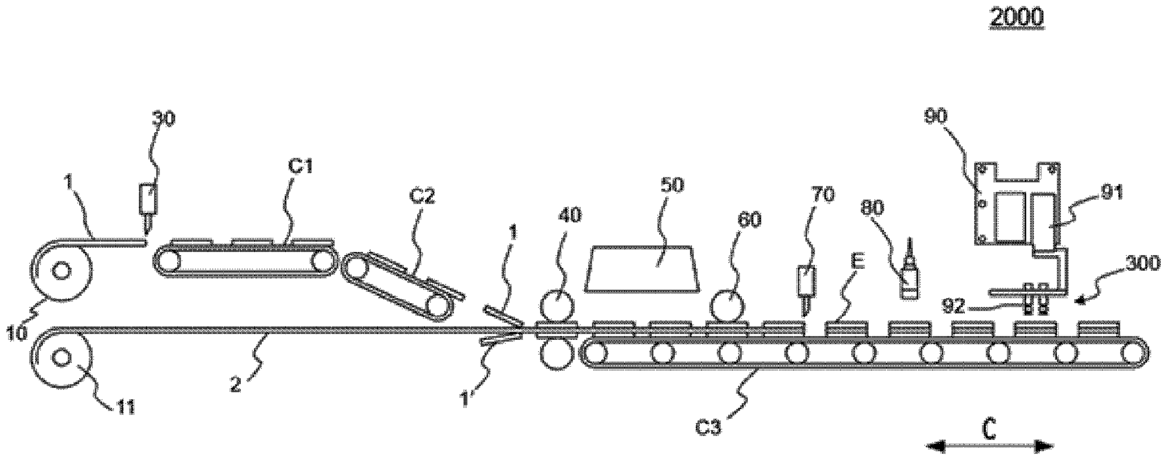

【FIG. 3】
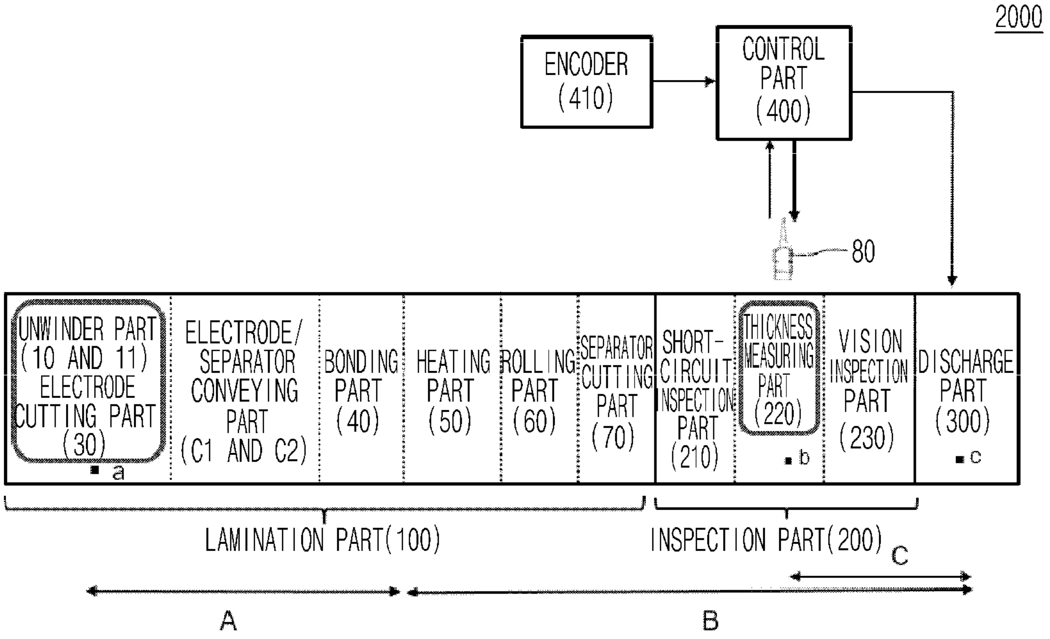

【FIG. 4】
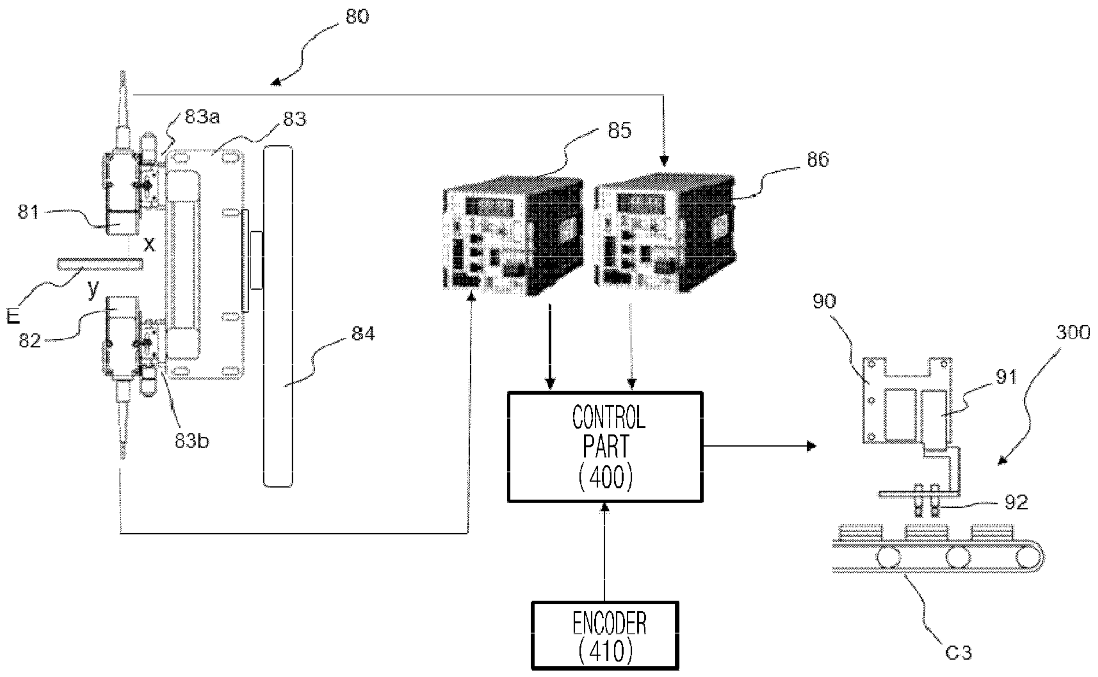

【FIG. 5】
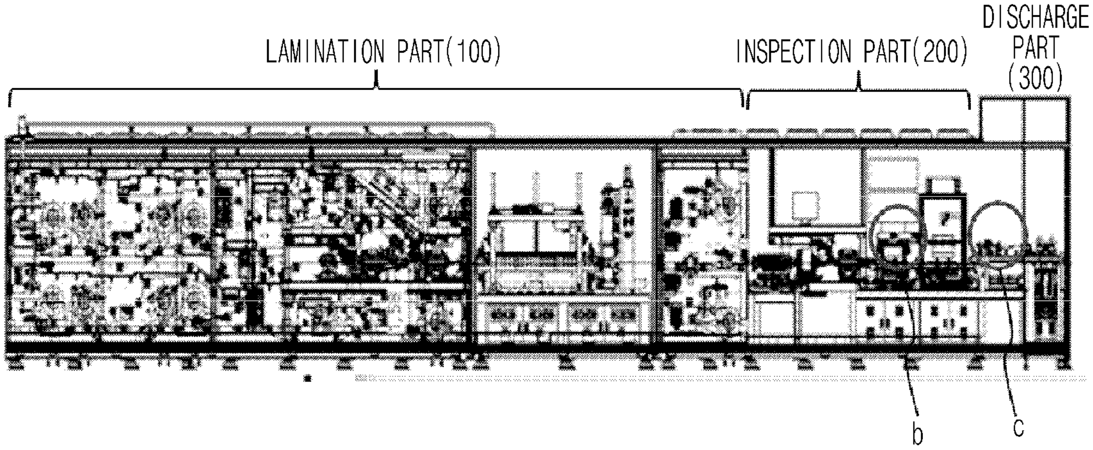

LAMINATION DEVICE AND METHOD FOR DISCHARGING DEFECTIVE ELECTRODE CELL ASSEMBLY OF LAMINATION DEVICE

CROSS-REFERENCE TO RELATED APPLICATIONS

This application is a national stage entry under 35 U.S.C. § 371 of International Application No. PCT/KR2022/001615, filed on Jan. 28, 2022, which claims priority to Korean Patent Application No. 10-2021-0016038, filed on Feb. 4, 2021, the disclosures of which are hereby incorporated herein by reference in their entireties.

TECHNICAL FIELD

The present invention relates to a lamination apparatus configured to manufacture an electrode cell assembly by laminating an electrode and a separator, and more particularly, to a lamination apparatus capable of effectively separating and discharging a defective electrode cell assembly including a connection tape of an electrode or a separator, and a method of discharging a defective electrode cell assembly by the lamination apparatus.

BACKGROUND ART

As the price for energy sources increases due to the depletion of fossil fuels and interest in environmental pollution is amplified, environmentally friendly alternative energy sources have become an essential factor for future life. In particular, as the technical development of and the demand for mobile devices increase, the demand for secondary batteries as an energy source is rapidly increasing.

In general, secondary batteries refer to batteries that are chargeable and dischargeable unlike primary batteries that are not chargeable, and the secondary batteries are widely used in various fields such as mobile phones, notebook computers, automobiles, and the like.

Such secondary batteries are manufactured to have a form including an electrode assembly enclosed in a battery case together with an electrolyte. In order to manufacture the electrode assembly, a lamination process for bonding between an electrode and a separator is required.

The lamination process includes unwinding electrodes and separators from an unwinder, cutting the electrodes, conveying the electrodes and the separators, bonding the electrode and the separator so that the electrode and the separator are alternately disposed, heating the bonded electrode and separator, rolling the heated electrode/separator, and cutting the separators after the heating and rolling to manufacture an electrode cell assembly of a basic unit. At the end of the lamination process, a process of inspecting and discharging the bonded and laminated electrode cell assembly is performed. One or a plurality of normal electrode cell assemblies that have passed the inspection may be laminated and received as an electrode assembly in a case to manufacture a secondary battery.

FIG. 1 is a diagram illustrating an example of a conventional lamination apparatus 1000.

As shown, the lamination apparatus 1000 includes a lamination part configured to manufacture an electrode cell assembly by laminating electrodes 1 and separators 2, an inspection part configured to inspect the electrode cell assembly, and a discharge part configured to discharge the electrode cell assembly whose inspection is completed.

The lamination part includes unwinder parts 10 and 11, an electrode cutting part 30, electrode/separator conveying parts C1 and C2, a bonding part 40, a heating part 50, a rolling part 60, and a separator cutting part 70. Specifically, the electrodes 1 and the separators 2 are unwound from an electrode unwinder roll 10 and a separator unwinder roll 11 of the unwinder parts, respectively, and the electrodes 1 are first sequentially cut in the electrode cutting part 30. The cut electrode is moved along first and second conveyors C1 and C2 onto the separator 2, and the electrode 1 and the separator 2 are matched and bonded to each other in the bonding part 40. Another electrode 1' (lower electrode) is conveyed to a lower portion of a conveying line for the separator 2 and bonded to the (upper) electrode 1 and the separator 2 in the bonding part 40. For convenience of illustration, an illustration of a conveying line for the lower electrode is omitted.

The bonded electrode/separator is heated in the heating part 50 and rolled in the rolling part 60, and then the separators 2 are cut in the separator cutting part 70 to complete an electrode cell assembly E of a predetermined unit. In operations after the heating part 50, the electrode/separator is conveyed by a third conveyor C3.

The completed electrode cell assembly E is inspected for appearance/dimensions by a camera or the like, and then, conveyed and discharged to a discharge part 300 to be sent to a subsequent process.

Meanwhile, the electrode 1 and the separator 2 are manufactured in a roll-to-roll manner in electrode and separator manufacturing processes performed before the lamination process, and in the roll-to-roll manufacturing process, in order to continuously manufacture the electrode and separator, a connection portion (splicing portion) connecting a rear end of one roll and a front end of another roll is inevitably included in an electrode roll and a separator roll. In addition, when a defect is generated during the manufacturing process, and a connection portion in which the electrode or the separator of the defected portion is removed and then the rolls are connected again may be included. The connection portion is formed of a connection tape such as a polyethylene terephthalate (PET) tape. Since the connection portion is not coated with the electrode or is made of a material different from those of an electrode current collector and the separator, when such a portion is included in the electrode cell assembly, a defect occurs. Thus, it is necessary to remove such a defective electrode cell assembly in the lamination process.

Since the connection tape has a different color from the electrode or the separator that is a base material, the connection tape may be detected by a color sensor. That is, as shown in FIG. 1, conventionally, color sensors 20 and 20' have been disposed between the electrode unwinder roll 10 and the electrode cutting part 30 or near the separator unwinder roll 11 to detect the connection tape included in the electrode or the separator. The color sensors 20 and 20' may each distinguish colors by transmitting white light through the electrode or the separator and then analyzing RGB values of reflected light.

The electrode/separator, which includes the connection tape and is detected by the color sensors 20 and 20', is then laminated and discharged as the electrode cell assembly. In the discharge part 300, among the electrode cell assemblies, the defective electrode cell assembly, in which the connection tape is included in the electrode or the separator, is adsorbed and removed by a separating and discharging member.

When a defective portion, in which the connection tape is included, for example, in the electrode 1, is detected by the color sensors 20 and 20', a distance A from a defect detection point to the front of the heating part 50 is calculated by encoders (not shown) installed at the first and second conveyors C1 and C2, and a distance B until the electrode cell assembly including a defective electrode reaches the discharge part is calculated by an encoder (not shown) installed at the third conveyor C3. Alternatively, when a defective portion is detected in the separator 2, a distance A from a defect detection point to the front of the heating part 50 is calculated by an encoder (not shown) installed at the separator unwinder roll 11, and a distance B until the electrode cell assembly including a defective separator reaches the discharge part is calculated by an encoder (not shown) installed at the third conveyor C3. When the distances A and B are calculated, a time point at which the defective electrode cell assembly reaches the discharge part is calculated by dividing the distance by a conveying speed of the conveyor or an unwinding speed, and a separate and discharge member 90 removes the defective electrode cell assembly from the conveyor at the time point at which the defective electrode cell assembly reaches (a discharge port of) the discharge part 300. A defect detection signal is sent to a power line communication (PLC) control part (not shown) from the color sensors 20 and 20', and the PLC control part calculates the arrival time point of the defective electrode cell assembly by using predetermined software, and transmits a control signal for discharging the defective electrode cell assembly to the discharge member 90 of the discharge part 300.

However, according to the conventional method, the defect detection is previously performed in an introduction part of the lamination apparatus 1000, and after a long time, the discharge of the defective electrode cell assembly is performed in the discharge part 300, and thus it is difficult to calculate an accurate discharge time point of the defective electrode cell assembly because a distance between a defect recognition point and the discharge port is too long (approximately 15 to 20 m). That is, since the distance to the discharge part 300 is too long, an error inevitably occurs in the discharge of the cell assembly specified as defective. In addition, an arrival time point of the defective electrode cell assembly is calculated by summing distance values respectively measured by a plurality of encoders because the electrode cell assembly moves, and thus, there is a problem in that a calculation process is complicated and time for preserving and processing data is required. Furthermore, since the electrode and the separator are subjected to processes such as cutting, bonding, heating, and rolling after the unwinder, certain vibrations inevitably occur in the conveyor, and accordingly, a slight change in the conveying speed of the conveyor is generated, and the error at the arrival time point is inevitably larger.

In the conventional method, the reason in which the color sensors 20 and 20' are installed near the unwinder is that the color sensors 20 and 20' should be installed at a location before the electrodes or separators are stacked and cut because the connection tape is not exposed at a surface of the electrode or the separator after the electrode/separator is bonded and laminated and thus may not be detected by the color sensors 20 and 20'. Thus, according to the conventional method in which the defective electrode cell assembly is detected using the color sensors 20 and 20', there is an inevitability that the color sensor for detecting defects should be installed near the unwinder before the process of cutting the electrodes.

According to the conventional connection tape detection method, errors inevitably occur at an arrival time point of the defective electrode cell assembly at the discharge part. Thus, conventionally, even the cell assemblies before and after the cell assembly, which are presumed to include the connection tape, are regarded as defective electrode cell assemblies and discharged. Accordingly, a total of three, in many cases, up to four or five normal cell assemblies, including the cell assembly actually including the connection tape, are discharged as defective electrode cell assemblies, and thus there is a problem in that product manufacturing yield is greatly reduced.

Accordingly, it is desired to develop a technique capable of increasing product manufacturing yield by accurately discharging only defective electrode cell assemblies in an electrode/separator lamination apparatus.

PRIOR-ART DOCUMENTS

Patent Documents

Korean Patent Publication No. 10-2167118

DISCLOSURE

Technical Problem

An object of the present invention is to provide a lamination apparatus capable of efficiently discharging only a defective electrode cell assembly including a connection tape by detecting the defective electrode cell assembly among electrode cell assemblies after cutting electrodes or separators, and a method of discharging a defective electrode cell assembly by the same.

Another object of the present invention is to provide a lamination apparatus capable of accurately detecting a defective electrode cell assembly by minimizing the effects of bonding, heating, rolling, cutting, and the like an electrode/separator and a method of discharging a defective electrode cell assembly.

Technical Solution

One aspect of the present invention provides a lamination apparatus configured to manufacture an electrode cell assembly by laminating an electrode and a separator respectively unwound from an electrode roll and a separator roll, the lamination apparatus including a lamination part configured to manufacture the electrode cell assembly through lamination, an inspection part configured to detect a defective electrode cell assembly by measuring a thickness of the manufactured electrode cell assembly, a discharge part configured to separate and discharge the defective electrode cell assembly from a normal electrode cell assembly, and a control part configured to perform control so as to calculate a time point at which the defective electrode cell assembly reaches the discharge part on the basis of distance data between a point at which the defective electrode cell assembly is detected and the discharge part and separate and discharge the defective electrode cell assembly when the defective electrode cell assembly reaches the discharge part.

In an example, the lamination apparatus of the present invention may obtain the time point at which the defective electrode cell assembly reaches the discharge part by dividing the distance data by a conveying speed of a conveyor.

In a specific example, the distance data may be detected by an encoder installed at a conveyor driving part configured to convey the electrode cell assembly.

In another example, the inspection part may include a thickness measuring part for measuring a thickness of the electrode cell assembly and a vision inspection part configured to inspect at least one of an appearance, a shape, and dimensions of the battery cell assembly.

In a specific example, the thickness measuring part may be installed in front of the vision inspection part.

In an example, the thickness of the battery cell assembly may be measured in a non-contact manner.

In a specific example, the thickness of the battery cell assembly may be measured by a confocal thickness sensor.

In a preferred example, the confocal thickness sensor may be installed on an XYZ stage.

Further, two confocal thickness sensors may be respectively disposed above and below the electrode cell assembly, and the thickness of the electrode cell assembly may be measured by a difference of a distance between the electrode cell assembly and the confocal thickness sensor disposed thereabove and a distance between the electrode cell assembly and the confocal thickness sensor disposed therebelow.

In this case, the two upper and lower confocal thickness sensors may be mounted on one bracket, and the bracket may be installed on an XYZ stage.

In another example, in order to ensure the discharge of the defective electrode cell assembly, the control part may perform control such that one electrode cell assembly adjacent to the defective electrode cell assembly is discharged together with the defective electrode cell assembly.

Another aspect of the present invention provides a method of discharging a defective electrode cell assembly by a lamination apparatus configured to manufacture an electrode cell assembly by laminating an electrode and a separator, the method including detecting a defective electrode cell assembly by measuring a thickness of the electrode cell assembly after the electrode and the separator are laminated to form the electrode cell assembly, calculating a time point at which the defective electrode cell assembly reaches a discharge part on the basis of distance data between a point at which the defective electrode cell assembly is detected and the discharge part, and separating and discharging the defective electrode cell assembly from a normal electrode cell assembly at the time point at which the defective electrode cell assembly reaches the discharge part.

Advantageous Effects

According to the present invention, a capability of detecting a defective electrode cell assembly is improved as compared with a conventional method of detecting a connection tape at an early stage of a lamination process. Since a distance for discharging the defective electrode cell assembly after a defect is detected is short, errors in power line communication (PLC) control can be reduced, such that only the defective electrode cell assembly can be discharged relatively accurately.

Accordingly, the amount of normal electrode cell assemblies discharged as defective electrode cell assemblies can be greatly reduced, thereby greatly improving product manufacturing yield.

Further, according to the present invention, a thickness of an electrode cell assembly can be accurately measured despite an impact caused by bonding, heating, rolling, cutting, and the like an electrode/separator, thereby effectively detecting a defective electrode cell assembly.

BRIEF DESCRIPTION OF THE DRAWINGS

FIG. 1 is a diagram illustrating an example of a conventional lamination apparatus.

FIG. 2 is an overall schematic diagram of a lamination apparatus of the present invention.

FIG. 3 is a schematic diagram illustrating details related to the measurement of a thickness of an electrode cell assembly and the control of discharging a defective electrode cell assembly by the lamination apparatus of the present invention.

FIG. 4 is a schematic diagram illustrating another embodiment of the lamination apparatus of the present invention.

FIG. 5 is a side view illustrating an actual example of the lamination apparatus to which the present invention is applied.

DETAILED DESCRIPTION OF THE PREFERRED EMBODIMENTS

Hereinafter, the detailed configuration of the present invention will be described in detail with reference to the accompanying drawings and various embodiments. The embodiments described below are exemplarily illustrated for understanding of the invention, and the accompanying drawings are not shown to actual scale to aid in understanding the invention, and dimensions of some components may be illustrated as being exaggerated.

While the present invention is susceptible to various modifications and alternative forms, specific embodiments thereof are shown by way of example in the drawings and will be described in detail herein. It should be understood, however, that there is no intent to limit the present invention to the particular forms disclosed, but on the contrary, the present invention is to cover all modifications, equivalents, and alternatives falling within the spirit and scope of the present invention.

The present invention is related to a lamination apparatus configured to manufacture an electrode cell assembly by laminating an electrode and a separator respectively unwound from an electrode roll and a separator roll, and the lamination apparatus includes a lamination part configured to manufacture the electrode cell assembly through lamination, an inspection part configured to detect a defective electrode cell assembly by measuring a thickness of the manufactured electrode cell assembly, a discharge part configured to separate and discharge the defective electrode cell assembly from a normal electrode cell assembly, and a control part configured to perform control so as to calculate a time point at which the defective electrode cell assembly reaches the discharge part on the basis of distance data between a point at which the defective electrode cell assembly is detected and the discharge part and separate and discharge the defective electrode cell assembly when the defective electrode cell assembly reaches the discharge part.

The main feature of the present invention is that the defective electrode cell assembly is detected by measuring the thickness of the electrode cell assembly excluding the conventional method of using a connection tape of an electrode or a separator by using a color sensor. Since the conventional method of detecting the connection tape by measuring colors of the electrode or the separator may not be applied after an electrode/separator is cut and laminated, color sensors 20 and 20' are inevitably disposed before the electrode or the separator is cut (see FIG. 1). However, the method of detecting the defective electrode cell assembly, which includes the connection tape, by measuring the thickness of the electrode cell assembly may be applied even after the electrode/separator is cut and laminated, and thus there is no limitation as in the conventional method. The connection tape included in the electrode or the separator has a thickness greater than that of the electrode or the separator, which is a base material, and thus the electrode cell assembly including the connection tape is thicker than the normal electrode cell assembly. Thus, when the thickness of the electrode cell assembly is measured, the defective electrode cell assembly may be detected. For example, there may be an electrode-separator-electrode laminated cell assembly and an electrode-separator-electrode-separator-electrode laminated cell assembly, and among them, when the electrode or the separator included in the cell assembly has a thickness different from a predetermined set thickness, a thickness of the entire cell assembly is also different from a set thickness of the normal cell assembly. The present invention is completely different from the related art in that the defective electrode cell assembly is detected in a cell assembly state by measuring the thickness of the battery cell assembly. As will be described below, the detection of the thickness of the electrode cell assembly may be performed by a confocal thickness sensor.

As described above, in the present invention, since the defective electrode cell assembly is detected by the thickness detection in the electrode cell assembly stage, a distance between a point at which the defective electrode cell assembly is recognized (detected) and the discharge part is very short. In addition, as will be described below, the distance is easily measured by an encoder installed at a conveyor configured to convey the electrode cell assembly. Thus, a time point at which the defective electrode cell assembly reaches the discharge part may be easily calculated on the basis of the distance data. Since a distance (2 to 3 m) between the defect detection point and the discharge part is much shorter than a distance (15 to 20 m) in the conventional method using the color sensor, the calculation of the arrival time point using the distance data is very accurate, and an error is not large. Furthermore, in the present invention, since the defective electrode cell assembly is detected at the stage in which the electrode cell assembly is manufactured, the defective electrode cell assembly may be detected and discharged without being affected by an impact received by the conveyor caused by electrode cutting, electrode/separator bonding, heating and rolling, separator cutting, and the like. Even when the impact is applied on the conveyor during a short-distance movement between the defect detection point and the discharge part, as will be described below, the defective electrode cell assembly may be accurately detected by using the specific confocal thickness sensor of the present invention.

The lamination apparatus and a method of discharging a defective electrode cell assembly by the same of the present invention will be described in more detail with reference to the following embodiments and the accompanying drawings.

Modes of the Invention

First Embodiment

FIG. 2 is an overall schematic diagram of a lamination apparatus 2000 of the present invention, and FIG. 3 is a schematic diagram illustrating details related to the measurement of a thickness of an electrode cell assembly and the control of discharging a defective electrode cell assembly by the lamination apparatus 2000 of the present invention.

In the present embodiment, the same components as those of the conventional lamination apparatus are denoted by the same reference numerals, and detailed descriptions thereof will be omitted.

As shown in FIGS. 2 and 3, electrodes 1 and separators 2 are respectively unwound from an electrode unwinder roll 10 and a separator unwinder roll 11 in an unwinder part. Thereafter, the electrodes 1 are sequentially cut and conveyed on a first conveyor C1, conveyed to a second conveyor C2, and placed on the separators 2. In a bonding part 40, the electrode 1 is positionally matched and bonded to the separator 2. Another electrode 1' (lower electrode) is conveyed to a lower portion of a conveying line for the separator 2 and bonded to the (upper) electrode 1 and the separator 2 in the bonding part 40. For convenience of illustration, an illustration of a conveying line of the lower electrode 1' is omitted.

Although the electrode cell assembly in which the electrode, the separator, and the electrode are laminated is illustrated as an example in the present embodiment, lamination of an electrode cell assembly having a bi-cell type, for example, an electrode-separator-electrode-separator-electrode assembly, or other laminated structures is also possible. For example, the present invention is applicable to any form of a cell assembly as long as it is capable of measuring a thickness of an assembly and discharging a defective electrode cell assembly no matter what type of electrode cell assembly is laminated.

The bonded electrode/separator is heated in a heating part 50 and is closely bonded in a rolling part 60. Thereafter, the separators 2 are cut and laminated to be manufactured in the form of an electrode cell assembly E in a separator cutting part 70. From the unwinder part to an electrode cutting part may be referred to as a lamination part 100, and thereafter, the electrode cell assembly E is discharged toward a subsequent process by a discharge part 300 after being subjected to a predetermined inspection in an inspection part 200 (see FIG. 3).

The order of cutting, bonding, heating, and rolling in the lamination part 100 may be changed according to the lamination type or order of the cell assembly to be manufactured. Since the above lamination process is a process performed in a typical lamination apparatus, a detailed description thereof will be omitted.

As shown in FIG. 3, in the inspection operation after the lamination process, a short-circuit inspection for inspecting whether a current flows when the current runs through the electrode cell assembly is performed by a short-circuit inspection part 210. In addition, after the short-circuit inspection, a vision inspection for inspecting an appearance defect, a dimension/width defect, and the like may be performed by a vision inspection part 230 in which a charge coupled device (CCD) camera and the like are installed.

The main feature of the present invention is that the defective electrode cell assembly including the connection tape is detected after the electrode cell assembly E is manufactured in the lamination process.

In the present invention, since the defective electrode cell assembly may be detected by measuring the thickness of the electrode cell assembly, a thickness measuring part 220 may be disposed in the inspection part 200 after the electrode cell assembly E is manufactured. The defective electrode cell assembly is thicker than the normal electrode cell assembly because the connection tape is included in the electrode or separator. Thus, when the thickness measuring part 220 is installed in the inspection part 200, the defective electrode cell assembly is able to be detected. In one embodiment, the thickness measuring part 220 may be disposed in front of the vision inspection part 230 configured to inspect the appearance, shape, dimensions, and the like of the electrode cell assembly E, but the arrangement order of the thickness measuring part 220 is not limited thereto.

It is preferable that the thickness measurement of the electrode cell assembly E is able to be performed in a state of not coming into contact with the electrode cell assembly E in order to operate a manufacturing line continuously without stopping the manufacturing line. For example, as a non-contact thickness measurement sensor, an ultrasonic sensor, a displacement sensor, a laser sensor, a confocal thickness sensor, and the like may be applied. However, in the present invention, rather than a displacement sensor or the like suitable for measuring a thickness of a coating film, a confocal thickness sensor 80 configured to calculate a distance (thickness) by analyzing a wavelength of reflected light is preferable in that the sensor is for measuring a total thickness of the electrode cell assembly E. The confocal thickness sensor 80 may be installed to be movable in at least one of a vertical direction and a horizontal direction in order to adjust a focus or a distance between the confocal thickness sensor and the electrode cell assembly. In order to move the confocal thickness sensor 80, the sensor may be installed on an XYZ stage. Since the XYZ stage is a well-known member used for linear movement in the vertical direction and the horizontal direction (a left-right direction and a front-rear direction), a description thereof will be omitted.

When the defective electrode cell assembly is detected by the confocal thickness sensor 80, as shown in FIG. 3, data (thickness data) related thereto is transmitted to a control part 400. For example, when a measured thickness value is increased by more than a specific value in comparison with the normal cell assembly and maintained for a specific period of time, the control part 400 determines the electrode cell assembly to be a defective electrode cell assembly including a connection tape. Meanwhile, the control part 400 may transmit a control signal to the confocal thickness sensor 80 in order to change a distance control application mode of the confocal thickness sensor 80.

In addition, an encoder 410 installed at the third conveyor C3, for example, the encoder 410 installed at a motor driving part of the conveyor transmits data on a location of the conveyor to the control part 400 in real time as the conveyor moves. The control part 400 is connected to the encoder 410 and communicates therewith for power line communication (PLC) control, and thus even a point (location) b at which the defective electrode cell assembly is detected may be identified by the encoder 410. In addition, since a discharge port c of the defective electrode cell assembly in the discharge part 300 is determined, when the point b at which the defective electrode cell assembly is detected is determined, the encoder 410 may also detect a distance C from the defective electrode cell assembly to the discharge port. Accordingly, the control part 400 may receive the thickness data from the thickness measuring part 220 (e.g., the confocal thickness sensor 80) to confirm the defective electrode cell assembly, and receive the location b at that time and data on the distance C to the discharge port c from the encoder 410 to calculate a time point at which the defective electrode cell assembly reaches the discharge port c. That is, when the distance data is divided by a conveying speed of the conveyor, the time point at which the defective electrode cell assembly reaches the discharge part (the discharge port c) is obtained. This may be performed by predetermined software built into the control part 400. In this case, since the defective electrode cell assembly is detected by the thickness measuring part 220 installed in the inspection part 200, the distance C between the detection point b and the discharge port c is very short, about 2 to 3 m, and there is no need to preserve measurement data for a long period of time. In addition, since the distance may be detected by a single encoder installed at the conveyor (the third conveyor C3 in FIG. 2), the above calculation process is not complicated. Thus, according to the present invention, a time point at which the defective electrode cell assembly is discharged may be very accurately obtained without a large measurement error. That is, as shown in FIGS. 1 and 3, the discharge time point calculation process of the present invention is much simpler and has the advantage of high measurement accuracy as compared with the related art of calculating the time point at which the defective electrode cell assembly is discharged by including all of a conveying distance on a plurality of conveyors from a color sensor installation part a of an unwinder to a bonding part or a conveying distance A for a separator and a conveying distance B on another conveyor from a heating part to a discharge port c.

The control part 400 identifies the defective electrode cell assembly from the data on the thickness of the electrode cell assembly measured by the thickness measuring part 220, calculates a time point at which the defective electrode cell assembly reaches the discharge port c of the discharge part 300, and controls the discharge member 90 to separate and discharge the defective electrode cell assembly at the time point at which the defective electrode cell assembly reaches the discharge port c. That is, the discharge member 90, which receives a predetermined control signal for discharging the defective electrode cell assembly from the control part 400, may adsorb the defective electrode cell assembly and remove the defective electrode cell assembly from a conveyor line for the normal electrode cell assembly. To this end, the discharge member 90 includes an adsorbing member 92 capable of adsorbing the electrode cell assembly and a moving member 91 capable of moving the adsorbing member 92 from the conveyor line. Alternatively, the conveyor may be configured such that a conveyor line for the defective electrode cell assembly is branched at a point of the discharge port c of the conveyor line for the normal electrode cell assembly. In this case, a pusher (not shown) configured to push the defective electrode cell assembly to the branched conveyor line may be used as the discharge member 90 that discharges the defective electrode cell assembly according to the control signal of the control part 400.

According to the lamination apparatus 2000 of the present invention, since only the defective electrode cell assembly may be accurately separated and discharged, there is no need to also discharge spare normal electrode cell assemblies as in the related art.

Second Embodiment

FIG. 4 is a schematic diagram illustrating another embodiment of the lamination apparatus of the present invention.

The second embodiment has a form in which, as the thickness measuring part 220, two confocal thickness sensors are disposed above and below an electrode cell assembly.

For example, it is possible to measure a thickness of the electrode cell assembly in a non-contact manner even when one confocal thickness sensor is installed above or below the electrode cell assembly. However, as described above, in the lamination apparatus, processes of applying a predetermined impact to electrodes and separators such as cutting of the electrodes, cutting of the separators, heating, rolling, and the like are performed, and thus the electrodes or the separators on the conveyor and the conveyor subjected to such an impact are subjected to vibrations. Such an impact or vibration is also transmitted in the electrode cell assembly stage after laminating electrode/separator. The confocal thickness sensor measures the thickness of the electrode cell assembly by measuring a distance from the sensor to the electrode cell assembly, and thus, when the electrode cell assembly is subjected to vibrations, such as slightly bouncing on the conveyor due to vibrations, in some cases, the thickness of the electrode cell assembly may not be accurately measured.

In the second embodiment, two confocal thickness sensors 81 and 82 are respectively disposed above and below the cell assembly so that the thickness of the electrode cell assembly may be accurately measured even in the above case. In the present embodiment, as shown in FIG. 4, a thickness of an electrode cell assembly E is measured by a difference between a distance x between the electrode cell assembly E and the confocal thickness sensor 81 disposed thereabove and a distance y between the electrode cell assembly E and the confocal thickness sensor 82 disposed therebelow. Thus, even when the electrode cell assembly E receives an impact caused by the vibration of the conveyor, since an absolute value of a distance difference x-y (i.e., the thickness of the electrode cell assembly E) is always constant, the thickness of the electrode cell assembly E may be accurately measured.

Meanwhile, the upper and lower confocal thickness sensors 81 and 82 are firmly fixed by one bracket 83. The bracket 83 is designed in a "C" shape to minimize the vibration of the confocal thickness sensor, and the confocal thickness sensors 81 and 82 are mounted vertically on both front end parts 83*a* and 83*b* of the bracket 83, respectively. The bracket 83 is installed on an XYZ stage and is movable in a vertical or horizontal direction. Reference numeral 84 denotes a connection member 84 for installing the bracket 83 on the XYZ stage.

According to the present embodiment, since the thickness of the electrode cell assembly may be accurately measured even when an impact or vibration is inevitably generated in the lamination apparatus 2000, a defective electrode cell assembly including a connection tape may be extracted and only the defective electrode cell assembly may be discharged from the discharge part 300.

Meanwhile, when FIG. 3 is related to an embodiment in which the control part 400 directly controls the confocal thickness sensor, dedicated controllers 85 and 86 configured to control the confocal thickness sensor 80 may be provided in FIG. 4. The controllers 85 and 86 may serve to control a focus or the like of each of the upper and lower confocal thickness sensors 81 and 82 and simultaneously serve to transmit thickness data measured from the confocal thickness sensor to the control part 400. The control part 400 identifies the defective electrode cell assembly from the thickness measurement data transmitted from the controllers 85 and 86, and at the same time, receives a distance between the point b at which the defective electrode cell assembly is detected and (the discharge port c of) the discharge part from the encoder 410 to calculate a time point at which the defective electrode cell assembly reaches the discharge port. The control part 400 sends data on the arrival time point of the defective electrode cell assembly and an operation signal to the discharge member 90 installed in the discharge port c to control the discharge member 90 to remove the defective electrode cell assembly from the conveyor.

FIG. 5 is a side view illustrating an actual example of the lamination apparatus 2000 to which the present invention is applied.

As illustrated in the drawing, as compared with to the case in which the color sensor is installed in the related art, according to the present invention, it can be seen that the defective electrode cell assembly may be removed from the discharge port c with little or no measurement error because a distance between the point b at which the defective electrode cell assembly is recognized and the discharge port c of the discharge part is very short.

EXAMPLES

Comparative Example

As in the related art, a color sensor was installed between an unwinder part and an electrode cutting part of a lamination apparatus, and cell assemblies (a specific cell assembly and electrode cell assemblies before and after the specific cell assembly), which were presumed to be defective electrode cell assemblies, were removed from a discharge port to ensure the discharge of the defective electrode cell assembly.

Total number of electrode cell assemblies manufactured: 29,546

Number of discharged cell assemblies considered as defective electrode cell assemblies: 110 (0.372%)

Number of actual defective electrode cell assemblies: 35

As described above, a total of 110 cell assemblies were discharged as a result of discharging the defective electrode cell assemblies by the lamination apparatus of Comparative Example. As a result of inspecting the discharged cell assemblies again, the number of actual defective electrode cell assemblies was 35.

EXAMPLE

When a confocal thickness sensor of the present invention was installed in an inspection part, the number of discharged defective electrode cell assemblies was 35 (0.118%).

Accordingly, according to the present invention, it can be seen that manufacturing yield can be improved by about 0.254%.

The method of discharging the defective electrode cell assembly by the lamination apparatus according to the present invention may be summarized again as follows.

First, after electrodes and separators are laminated to form an electrode cell assembly E, a thickness of the electrode cell assembly is measured to detect a defective electrode cell assembly.

Further, a time point at which the defective electrode cell assembly reaches a discharge part (more precisely, a discharge port c of the discharge part at which the defective electrode cell assembly is separated and discharged from a normal electrode cell assembly) is calculated on the basis of distance data (e.g., distance data extracted from an encoder of a conveyor) between a point b at which the defective electrode cell assembly is recognized (detected) and the discharge part.

Thereafter, the defective electrode cell assembly may be separated from the normal electrode cell assembly and discharged at the time point at which the defective electrode cell assembly reaches the discharge part.

Meanwhile, according to the present invention, only the defective electrode cell assembly may be accurately detected, but a distance between a thickness measuring part and the discharge part may be further increased as the apparatus becomes larger. Alternatively, a slight error may occur in a process of calculating the arrival time point of the defective electrode cell assembly due to an impact in a lamination process. In this case, in order to ensure the discharge of the defective electrode cell assembly, one electrode cell assembly adjacent to the defective electrode cell assembly may be discharged together with the defective electrode cell assembly. However, even in the case of the discharge of spare cell assemblies, there is no large measurement error to the extent that up to four or five cell assemblies when there as many as two or three cell assemblies before and after the cell assembly, which are estimated to be a defective electrode cell assembly, as in the related art, are discharged. The reason is that, by measuring the thickness, the defective electrode cell assembly is detected after the electrode cell assembly is manufactured, and accordingly, the defective electrode cell assembly is accurately discharged due to the control of the distance/defect discharge time point.

In the above, the present invention has been described in more detail with reference to the drawings and embodiments. However, since the configuration described in the drawings or embodiments described herein is merely one embodiment of the present invention and do not represent the overall technical spirit of the invention, it should be understood that the invention covers various equivalents, modifications, and substitutions at the time of filing of this application.

DESCRIPTION OF REFERENCE NUMERALS

1 and 1': electrodes
2: separator
10: electrode unwinder roll
11: separator unwinder roll
20: color sensor
30: electrode cutting part
40: bonding part
50: heating part
60: rolling part
70: separator cutting part
80: confocal thickness sensor
90: discharge member
91: moving member
92: adsorbing member
100: lamination part
200: inspection part
210: short-circuit inspection part
220: thickness measuring part
230: vision inspection part
300: discharge part
400: control part
410: encoder
C1: first conveyor
C2: second conveyor
C3: third conveyor
E: electrode cell assembly
a: color sensor installation part
b: defective electrode cell assembly recognition point
c: discharge port
2000: lamination apparatus

The invention claimed is:

1. A lamination apparatus for manufacturing an electrode cell assembly by laminating an electrode and a separator respectively unwound from an electrode roll and a separator roll, the lamination apparatus comprising:

a lamination part comprising a bonding part, a heating part, a rolling part, and a separator cutting part interconnected to one another, the bonding part, the heating part, and the rolling part configured to laminate the electrode cell assembly, the cutting part configured to cut the electrode cell assembly;

an inspection part comprising a non-contact thickness measurement sensor configured to detect a defective electrode cell assembly by measuring a thickness of the electrode cell assembly, the non-contact thickness measurement sensor being installed on a stage configured to move in three dimensions;

a discharge part configured to separate the defective electrode cell assembly from the lamination apparatus and to discharge the defective electrode cell assembly from the lamination apparatus; and a control part electrically connected to the non-contact thickness measurement sensor and the discharge part and configured to calculate a time point at which the defective electrode cell assembly reaches the discharge part on the basis of distance data between a point at which the defective electrode cell assembly is detected and the discharge part and separate, the control part configured to discharge the defective electrode cell assembly when the defective electrode cell assembly reaches the discharge part.

2. The lamination apparatus of claim 1, further comprising a conveyor interconnected with the lamination part and configured to receive the electrode assembly thereon, wherein the time point at which the defective electrode cell assembly reaches the discharge part is obtained by dividing the distance data by a conveying speed of a conveyor.

3. The lamination apparatus of claim 1, further comprising a conveyor driving part interconnected with the lamination part and configured to convey the electrode cell assembly and an encoder installed at the conveyor driving part, wherein the distance data is detected by the encoder.

4. The lamination apparatus of claim 1, wherein the inspection part includes a thickness measuring part electrically connected to the control part and configured to measure a thickness of the electrode cell assembly and a vision inspection part electrically connected to the control part and configured to inspect at least one of an appearance, a shape, and dimensions of the electrode cell assembly.

5. The lamination apparatus of claim 4, wherein the thickness measuring part is installed before the vision inspection part in a conveying direction of the lamination apparatus.

6. The lamination apparatus of claim 1, wherein the non-contact thickness measurement sensor is a confocal thickness sensor.

7. The lamination apparatus of claim 6, wherein the confocal thickness sensor is an upper confocal thickness sensor, the apparatus further comprising a lower confocal thickness sensor, the upper and lower confocal thickness sensors being respectively disposed above and below a conveyor configured to receive the electrode cell assembly thereon, and the apparatus is configured to measure the thickness of the electrode cell assembly by calculating a difference of a distance between the electrode cell assembly and the upper confocal thickness sensor disposed thereabove and a distance between the electrode cell assembly and the lower confocal thickness sensor disposed therebelow.

8. The lamination apparatus of claim 7, wherein the upper and lower confocal thickness sensors are mounted on a same bracket, and the same bracket is installed on a stage configured to move in three dimensions.

9. The lamination apparatus of claim 1, wherein the control part is configured to discharge one electrode cell assembly adjacent to the defective electrode cell assembly together with the defective electrode cell assembly.

* * * * *